(12) United States Patent
Hong et al.

(10) Patent No.: US 7,195,367 B2
(45) Date of Patent: Mar. 27, 2007

(54) BACKLIGHT UNIT AND LIQUID CRYSTAL DISPLAY DEVICE HAVING THE SAME

(75) Inventors: Hee Jung Hong, Seoul (KR); Kyung Joon Kwon, Seoul (KR)

(73) Assignee: LG.Philips LCD Co., Ltd, Seoul (KR)

( * ) Notice: Subject to any disclaimer, the term of this patent is extended or adjusted under 35 U.S.C. 154(b) by 99 days.

(21) Appl. No.: 11/155,542

(22) Filed: Jun. 20, 2005

(65) Prior Publication Data

US 2006/0002106 A1   Jan. 5, 2006

(30) Foreign Application Priority Data

Jun. 30, 2004   (KR) .................. 10-2004-0050519

(51) Int. Cl.
*G09F 13/04* (2006.01)
*G02F 1/1335* (2006.01)
(52) U.S. Cl. .................. 362/97; 362/561; 362/225; 349/68
(58) Field of Classification Search ............ 362/97, 362/225, 231, 216; 349/65, 68
See application file for complete search history.

(56) References Cited

U.S. PATENT DOCUMENTS

| 5,971,567 | A | * | 10/1999 | Van Duijneveldt | 362/296 |
| 2003/0218875 | A1 | * | 11/2003 | Bissada | 362/84 |
| 2004/0062034 | A1 | * | 4/2004 | Hsieh et al. | 362/97 |
| 2004/0223319 | A1 | * | 11/2004 | Chou et al. | 362/97 |
| 2005/0073858 | A1 | * | 4/2005 | Kim et al. | 362/561 |
| 2005/0088587 | A1 | * | 4/2005 | Pan et al. | 349/65 |
| 2005/0195619 | A1 | * | 9/2005 | Tseng | 362/561 |

* cited by examiner

*Primary Examiner*—Ali Alavi
(74) *Attorney, Agent, or Firm*—McKenna Long & Aldridge LLP

(57) ABSTRACT

A backlight unit includes a light-emitting surface having N divided regions, N being a positive integer and the divided regions being symmetrically arranged along a vertical center line and a horizontal center line of the light-emitting surface, one of a plurality of fluorescent lamps in each of the divided regions, each of the fluorescent lamps having at least one bent portion and two electrodes respectively at two ends thereof, and an LED lamp arranged along one of the vertical center line and the horizontal center line and at a region where bent portions of the fluorescent lamps meet.

20 Claims, 7 Drawing Sheets

BACKLIGHT UNIT AND LIQUID CRYSTAL DISPLAY DEVICE HAVING THE SAME

The present invention claims the benefit of Korean Patent Application No. P2004-50519 filed in Korea on Jun. 30, 2004, which is hereby incorporated by reference.

BACKGROUND OF THE INVENTION

1. Field of the Invention

The present invention relates to a liquid crystal display device, and more particularly, to a backlight unit and a liquid crystal display device having the same that include a lamp with a bent shape to prevent a decrease in luminance.

2. Discussion of the Related Art

A cathode ray tube (CRT) device has been commonly used in televisions, measurement instruments, and information terminals, but a CRT device has a relatively heavy weight and a large size. Thus, a CRT device cannot satisfy the current demands of small-size and lightweight.

Hence, flat display devices, such as a liquid crystal display (LCD) device using an electric field optical effect, a plasma display panel (PDP) device using a gas discharge and an electroluminescence display (ELD) device using an electric field luminous effect, have been actively studied to substitute CRT devices. Among such display devices, LCD devices have been most actively studied because LCD devices have advantageous characteristics such as compact size, lightness and low power consumption. LCD devices have wide applications as ultra-thin flat display devices, for example, monitors for spacecrafts, aircrafts, notebook computers, laptop computers, desktop computers and large-sized display devices. Accordingly, the demand for LCD devices is continuously increasing.

In general, LCD devices control light transmittance from ambient light to display images. However, because an LCD device is non-self-luminous, it needs an external light source, such as a backlight unit. Such a backlight unit includes a cylindrical fluorescent lamp and is classified in one of two types, a direct type and an edge type, according to the arrangement of the fluorescent lamp.

In an edge type backlight unit, a lamp unit is provided at one side of a light-guiding plate. The lamp unit includes a lamp for emitting light, a lamp holder being inserted into both ends of the lamp to protect the lamp, and a reflective sheet having one side inserted to the light-guiding plate and surrounding the circumference of the lamp for reflecting light emitted from the lamp to the light-guiding plate. Thus, the edge type backlight unit is generally applied to relatively small sized LCD devices, e.g., monitors of a laptop computer and a desktop computer, because it is advantageous in that it has great uniformity of light, long life span, and thin profile of the LCD device.

With the trend of large-sized LCD devices of 20-inch or more, a direct type backlight unit is actively developed. In the direct type backlight unit, a plurality of lamps are formed along one line on a lower surface of a light-diffusion sheet, whereby the entire surface of the LCD panel is directly illuminated by light from the lamps. The direct type backlight unit, which has greater light efficiency as compared with an edge type backlight unit, is used for large-sized LCD devices requiring high luminance, e.g., large-sized monitors or televisions. A large-sized monitor or a television may be driven for a long time. Thus, one of the lamps of a direct type backlight unit may be broken while other lamps remain on, thereby causing a difference in luminance.

Accordingly, if one of the lamps is turned off due to malfunctions or the end of the lamp life, a screen portion corresponding to the turned-off lamp portion becomes darker as compared with surrounding portions of the screen. In this respect, it is necessary for the direct type LCD device to have a simple structure suitable for disassemble and assemble of the lamp unit.

FIG. 1 is an exploded perspective view illustrating an edge type backlight unit of an LCD device according to the related art. In FIG. 1, an edge type backlight unit includes an LCD panel 14, a lamp 10, a light-guiding plate 11, a light-diffusion sheet 12, a prism sheet 13, a fixation structure 15, and a lower reflective sheet 16. The LCD panel 14 displays images by using the lamp 10 as a light source and by controlling light transmittance thereof. Also, the light-guiding plate 11 guides light emitted from the lamp 10 to the LCD panel 14. Then, the light-diffusion sheet 12 diffuses the light guided by the light-guiding plate 11 to a predetermined angle. The prism sheet 13 concentrates the diffused light and sends the concentrated light to the rear of the LCD panel 14. The fixation structure 15 is positioned below the light-guiding plate 11. To minimize light loss, the lower reflective sheet 16 reflects the light progressing toward the fixation structure 15 to the LCD panel 14.

In addition, the edge type backlight unit according to the related art further includes lamp reflective sheets 18 and lamp holders 17. Each of the lamp reflective sheets 18 covers the lamp 10 except for a light-incidence surface of the light-guiding plate 11, thereby decreasing the loss of light incident on the light-incidence surface of the light-guiding plate 11 from the lamp 10. Also, the lamp holders 17 are positioned at both ends of the lamp 10 to secure the lamp 10 at a predetermined position and to maintain a predetermined interval between the light-incidence surface of the light-guiding plate 11 and the lamp 10. Further, the plurality of light-diffusion sheets 12 and prism sheets 13 may be deposited as needed.

If the edge type backlight unit according to the related art is used for the monitor, each one lamp 10 is positioned at both sides of the light-guiding plate 11. However, in case the edge type backlight unit is used for the notebook computer, the lamp may be positioned at any one side of the light-guiding plate 11.

FIG. 2 is an exploded perspective view illustrating a direct type backlight unit of an LCD device according to the related art. Referring to FIG. 2, a direct type backlight unit according to the related art includes a plurality of fluorescent lamps 1, an outer case 3, and light-scattering means 5a, 5b and 5c. The plurality of fluorescent lamps 1 are arranged at fixed intervals along one direction, and the outer case 3 fixes and supports the plurality of fluorescent lamps 1. The light-scattering means 5a, 5b and 5c are provided between the fluorescent lamps 1 and an LCD panel (not shown).

The light-scattering means 5a, 5b and 5c prevent the silhouette of the fluorescent lamps 1 from being reflected on the display surface of the LCD panel (not shown), and provide a light source with uniform luminance. For improving the light-scattering effect, there are a plurality of diffusion sheets and one diffusion plate between the fluorescent lamps 1 and the LCD panel. Also, a reflective sheet 7 is provided on an inner surface of the outer case 3 for concentrating the light emitted from the fluorescent lamps 1 to the display part of the LCD panel, thereby improving light efficiency.

The fluorescent lamps 1 are formed of cold cathode fluorescent lamps (CCFLs) having electrodes formed at both ends of a tube. Accordingly, when a voltage is applied to the electrodes of the fluorescent lamps 1, the fluorescent lamps 1 emit the light. Also, the both ends of the fluorescent lamp 1 are respectively inserted to holes formed on both sides of the outer case 3.

The both electrodes of the fluorescent lamp 1 are connected with power supplying wires 9 and 9a for transmitting the power of operating the fluorescent lamp 1. Also, the power supplying wires 9 and 9a are connected to a driving circuit by an additional connector. Thus, each fluorescent lamp 1 requires an individual connector. For example, the power supplying wire 9 connected to one electrode of the fluorescent lamp 1 and the power supplying wire 9a connected to the another electrode of the fluorescent lamp 1 are connected to one connector. Also, any one of the power supplying wires 9 and 9a is curved to the lower side of the outer case 3 for being connected with the connector.

FIG. 3 is a plane view illustrating another direct type backlight unit of an LCD device according to the related art. As shown in FIG. 3, a direct type backlight unit uses a plurality of U-shaped fluorescent lamps 31. In each of the U-shaped fluorescent lamps 31, electrodes are formed at the both ends and connected to respective connectors 33a and 33b of an inverter 32. The backlight unit also includes an outer case 30 for securing the fluorescent lamps 31.

However, the edge type backlight unit and the direct type backlight unit according to the related art have the following disadvantages. First, although the edge type backlight unit according to the related art can improve the uniformity of light with the light-scattering means 5a, 5b and 5c, the edge type backlight unit is not capable of partially controlling display luminance because it uses a light-guiding plate.

Similar to the edge type backlight unit, the direct type backlight unit according to the related art also has a limitation in partial control of display luminance. Further, if the U-shaped fluorescent lamps are partially overlapped one another, the luminance is partially lowered in the direct type backlight unit according to the related art.

SUMMARY OF THE INVENTION

Accordingly, the present invention is directed to a backlight unit and a liquid crystal display device having the same that substantially obviate one or more of the problems due to limitations and disadvantages of the related art.

An object of the present invention is to provide a backlight unit having a bent shape, to prevent the decrease of luminance in a backlight unit of a division structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a light-emitting surface having N divided regions, N being a positive integer and the divided regions being symmetrically arranged along a vertical center line and a horizontal center line of the light-emitting surface, one of a plurality of fluorescent lamps in each of the divided regions, each of the fluorescent lamps having at least one bent portion and two electrodes respectively at two ends thereof, and an LED lamp arranged along one of the vertical center line and the horizontal center line and at a region where bent portions of the fluorescent lamps meet.

In another aspect, a liquid crystal display device includes a liquid crystal display panel including an upper substrate, a lower substrate attached to the upper substrate, and a liquid crystal layer between the upper and lower substrates, and a backlight unit disposed at a back side of the liquid crystal display panel, the backlight unit including a light-emitting surface having N divided regions, N being a positive integer and the divided regions being symmetrically arranged along a vertical center line and a horizontal center line of the light-emitting surface, one of a plurality of fluorescent lamps in each of the divided regions, each of the fluorescent lamps having at least one bent portion and two electrodes respectively at two ends thereof, an LED lamp arranged along one of the vertical center line and the horizontal center line and at a region where bent portions of the fluorescent lamps meet, and a bottom cover securing the fluorescent lamps and the LED lamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
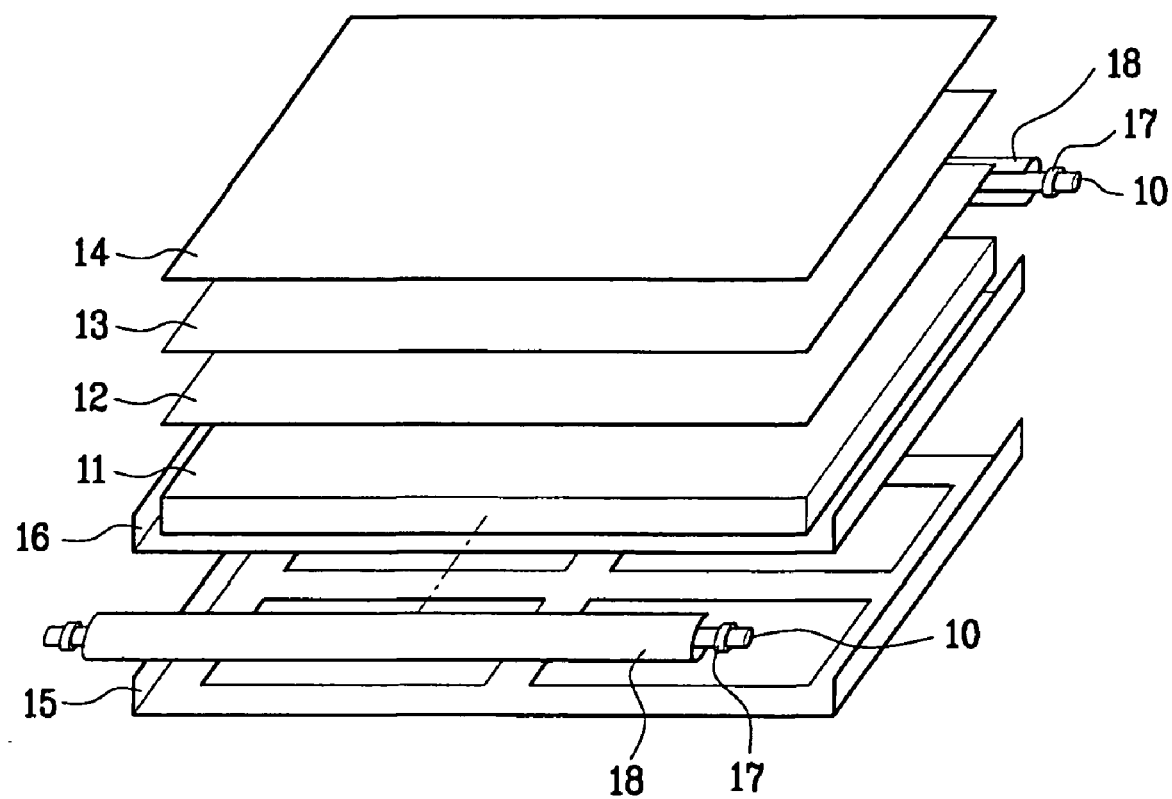
FIG. 1 is an exploded perspective view illustrating an edge type backlight unit of an LCD device according to the related art.
Figure 2:
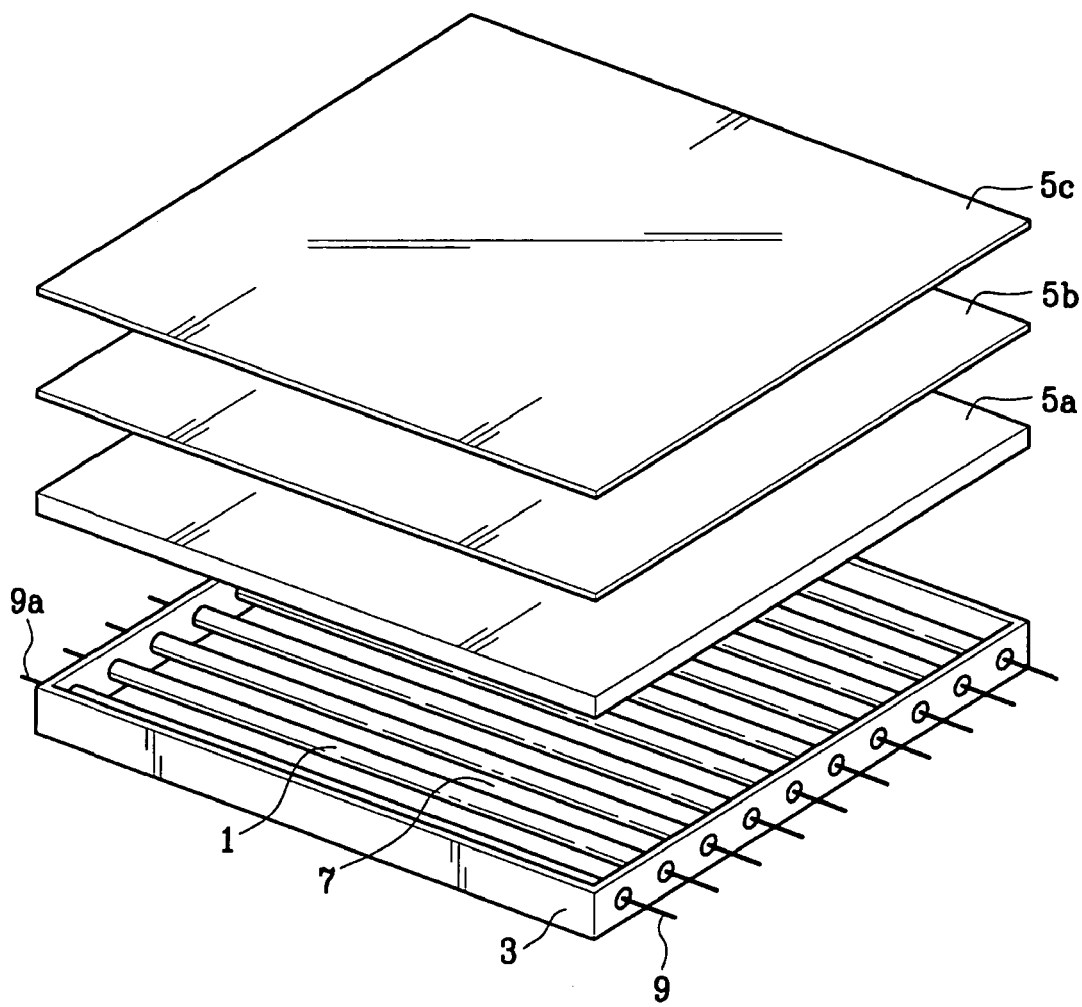
FIG. 2 is an exploded perspective view illustrating a direct type backlight unit of an LCD device according to the related art.
Figure 3:
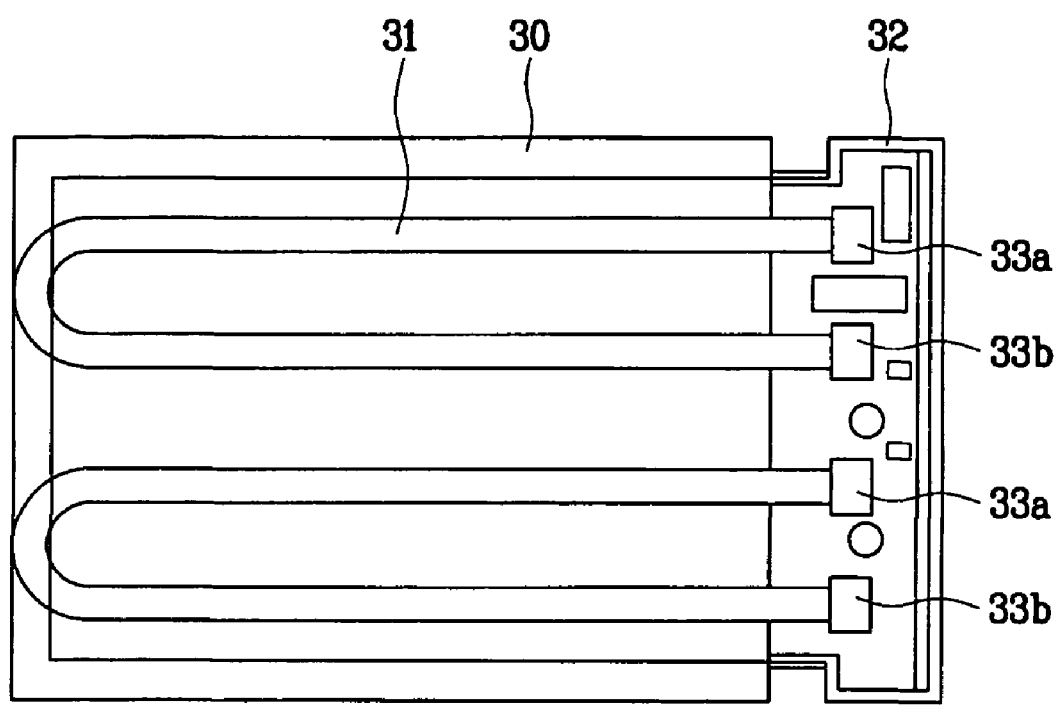
FIG. 3 is a plane view illustrating another direct type backlight unit of an LCD device according to the related art.
Figure 4:
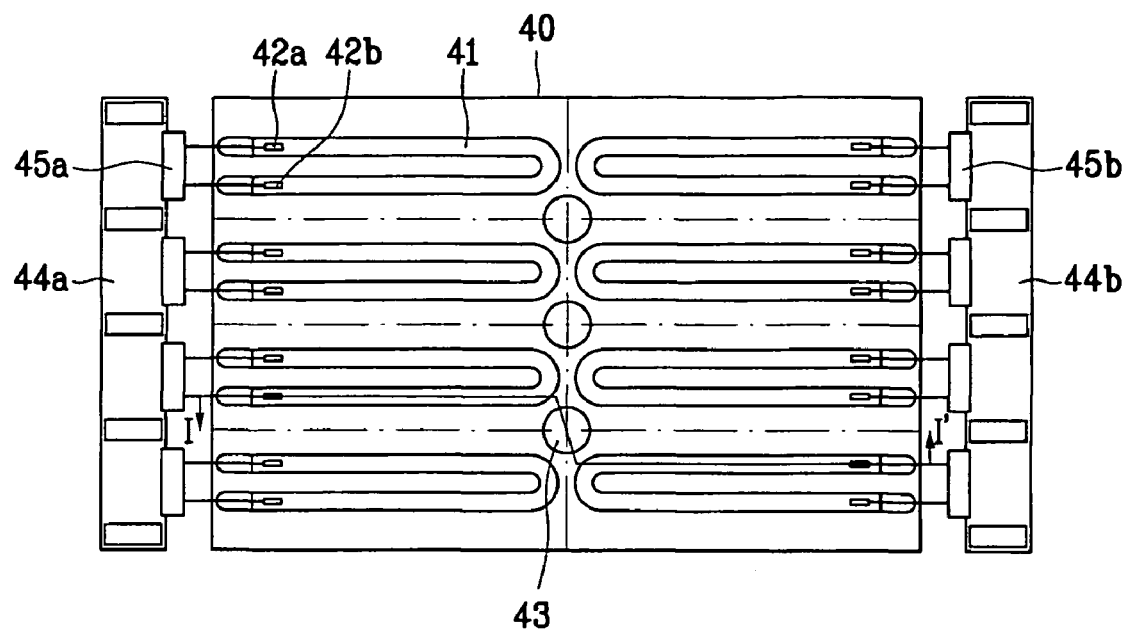
FIG. 4 is a plane view schematically illustrating a backlight unit of an LCD device according to an embodiment of the present invention.

FIG. 4 is a plane view schematically illustrating a backlight unit of an LCD device according to an embodiment of the present invention. In FIG. 4, a backlight unit has a light-emitting surface divided into N regions as illustrated by dashed lines. N is a positive integer, such as four, six or eight, and FIG. 4 illustrates a backlight unit having eight regions as an example. The N divided regions may have symmetric structures along a vertical center line and a horizontal center line of a light-emitting surface of the backlight unit. The vertical center line may be an imaginary vertical line drawn perpendicular from a mid-point along the width of the light-emitting surface, and the horizontal center line may be an imaginary horizontal drawn perpendicular from a mid-point along the length of the light-emitting surface.

In addition, each of the N divided regions includes a fluorescent lamp 41 having a bent structure. The fluorescent lamps 41 may be cold cathode fluorescent lamps (CCFLs). Further, in the N/2 left-side divided regions, the fluorescent lamps 41 may have an '⊃'-like shape, a shape similar to an U shape that is counterclockwise rotated by 90°, and in the N/2 right-side divided regions, the fluorescent lamps 41 may have an '⊂'-like shape, a shape similar to an U shape that is clockwise rotated by 90°.

Each of the fluorescent lamps 41 includes two lamp electrodes 42a and 42b respectively at two ends thereof. The lamp electrodes 42a and 42b are electrically connected to one of first and second connectors 45a and 45b and one of first and second inverters 44a and 44b. The first connectors 45a may include a plurality of first connectors, such that one connector is connected to two ends of a respective one of the fluorescent lamps 41. Similarly, the second connectors 45b may include a plurality of second connectors, such that one connector is connected to two ends of a respective one of the fluorescent lamps 41.

In particular, the first and second connectors 45a and 45b and the first and second inverters 44a and 44b may be arranged symmetrically along the vertical center line of the light emitting surface of the backlight unit. For example, the first connector 45a and the first inverter 44a may be provided at the left of the N/2 left-side divided regions, and the second connector 45b and the second inverter 44b may be provided at the right of the N/2 right-side divided regions.

A driving voltage may be applied from one of the first and second inverters 44a and 44b through one of the first and second connectors 45a and 45b to both ends of the respective fluorescent lamps 41. Accordingly, when the driving voltage is applied to the electrodes 42a and 42b of the fluorescent lamps 41 from the inverters 44a and 44b through the connectors 45a and 45b, the fluorescent lamps 41 emit light.

In addition, power supplying wires may be used to connect between the electrodes 42a and 42b and the first and second connectors 45a and 45b. For example, a first power supplying wire connected to one electrode 42a of the fluorescent lamp 41 and a second power supplying wire connected to the other electrode 42b of the fluorescent lamp 41 are connected with one connector. Since the fluorescent lamps 41 have an '⊃'-like or '⊂'-like shape, the fluorescent lamps 41 are connected with one connector without curving or bending the power supplying wires to a lower side of an outer case 40.

By having the N divided regions, the backlight unit provides partial luminance controls. However, the backlight unit may have a decrease in luminance in regions where the bent portions of the fluorescent lamps 41 meet. Accordingly, the backlight unit also includes a plurality of LED lamps 43.

In particular, the LED lamps 43 are arranged along the vertical center line of the light emitting surface of the backlight unit to maintain the uniformity of luminance along the central line.

Figure 5:
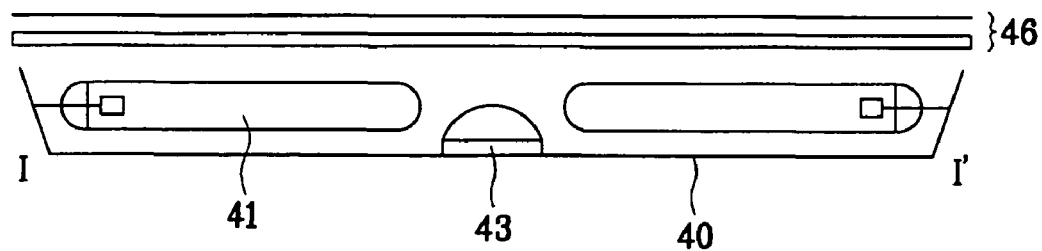
FIG. 5 is a cross-sectional view of the backlight unit shown in FIG. 4 along line I–I'.

FIG. 5 is a cross-sectional view of the backlight unit shown in FIG. 4 along line I–I'. As shown in FIG. 5, the outer case 40 is provided to fix and support the fluorescent lamps 41. Although not shown, both ends of the fluorescent lamp 41 may be respectively inserted to holes formed on both sides of the outer case 40. Also, light-scattering means 46 may be additionally provided between the lamps 41 and 43 and an LCD panel (not shown) for scattering and condensing light generated from the fluorescent lamps 41 and the LED lamps 43.

The light-scattering means 46 prevent the silhouette of the fluorescent lamps 41 from being reflected on the display surface of the LCD panel (not shown), and provide a light source with uniform luminance. For improving the light-scattering effect, there are a plurality of diffusion sheets and one diffusion plate between the lamps 41 and 43 and the LCD panel. Also, a reflective sheet (not shown) may be provided on an inner surface of the outer case 40 for reflecting light from the lamp to the LCD panel, to thereby prevent light loss and improve light efficiency.

Figure 6:
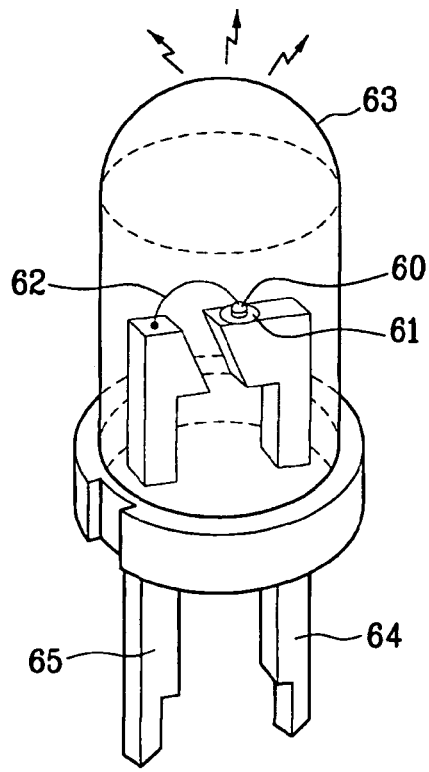
FIG. 6 is a perspective view schematically illustrating an LED lamp of the backlight unit shown in FIG. 4.

FIG. 6 is a perspective view schematically illustrating an LED lamp of the backlight unit shown in FIG. 4. As shown in FIG. 6, each of the LED lamps 43 (shown in FIG. 4) may include an LED chip 60, a reflective sheet 61, an optical lens 63, a cathode lead wire 64, and an anode lead wire 65. The LED chip 60 emits light, and the reflective sheet 61 may have a ring shape surrounding a bottom edge of the LED chip 60. Also, the optical lens 63 may have a bullet-like shape and covers the LED chip 60. The cathode lead wire 64 is connected to one end of the LED chip 60, and the anode lead wire 65 is connected to another end the LED chip 60 through a wire 62. The wire 62 may be formed of aurum Au, and upper portions of the cathode lead wire 64 and the anode lead wire 65 supporting the LED chip 60 may be formed of resin.

In the LED lamp 43, light emitted from the LED chip 60 is concentrated on the bullet-shaped optical lens 63, and then is progressing in a vertical direction to the outer surface of the optical lens 63. Also, although not shown, the cathode lead wire 64 and the anode lead wire 65 extend through a rear surface of the outer case 40, and may be connected to an electrode applying circuit, such as the circuit shown in FIG. 10, which will be discussed in details below.

The LED lamp 43 may be formed of a red lamp, a green lamp, a blue lamp, a white lamp, or a lamp emitting white light W by mixing red, green and blue light together. In particular, the LED lamp 43 may have the same chromaticity coordinates as that of an adjacent one of the fluorescent lamps 41. As a result, the LED lamp 43 compensates the luminance in the regions where the bent portions of the fluorescent lamps 41 meet.

Figure 7:
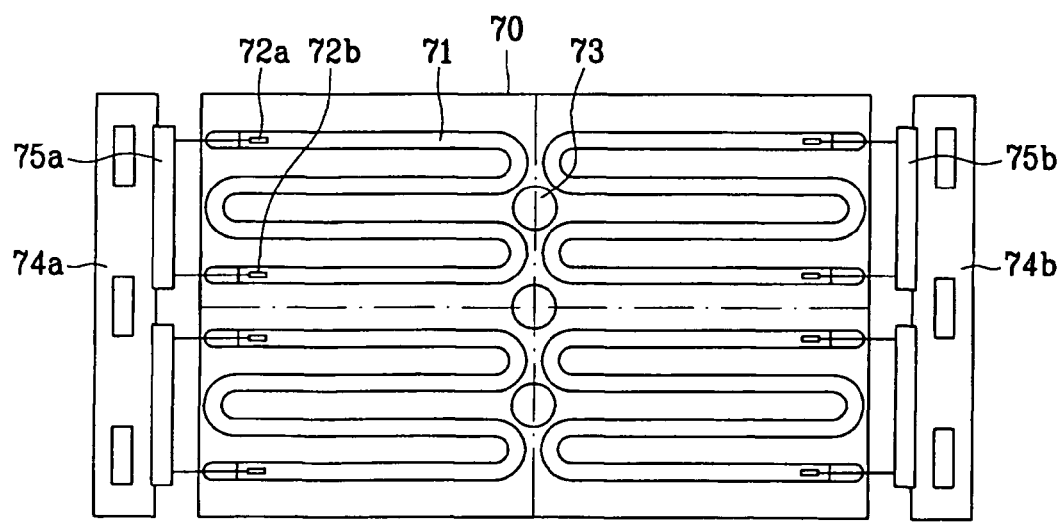
FIG. 7 is a plane view schematically illustrating a backlight unit of an LCD device according to another embodiment of the present invention.

FIG. 7 is a plane view schematically illustrating a backlight unit of an LCD device according to another embodiment of the present invention. In FIG. 7, a backlight unit has a light-emitting surface divided into four regions as illustrated by dashed lines, and the divided regions may have symmetric structures along a vertical center line and a horizontal center line of a light-emitting surface of the backlight unit. The vertical center line may be an imaginary vertical line drawn perpendicular from a mid-point along the width of the light-emitting surface, and the horizontal center line may be an imaginary horizontal drawn perpendicular from a mid-point along the length of the light-emitting surface.

Each of the divided regions includes a fluorescent lamp 71 having three bent portions. The fluorescent lamps 71 may be cold cathode fluorescent lamps (CCFLs). Further, in the left-side divided regions, the fluorescent lamps 71 may have an 'M'-like shape clockwise rotated by 90°, and in the right-side divided regions, the fluorescent lamps 71 may have an 'M'-like shape counterclockwise rotated by 90°.

Each of the fluorescent lamps 71 includes two lamp electrodes 72a and 72b respectively at two ends thereof. The lamp electrodes 72a and 72b are electrically connected to one of first and second connectors 75a and 75b and one of first and second inverters 74a and 74b. The first connectors 75a may include a plurality of first connectors, such that one connector is connected to two ends of a respective one of the fluorescent lamps 71. Similarly, the second connectors 75b may include a plurality of second connectors, such that one connector is connected to two ends of a respective one of the fluorescent lamps 71.

In particular, the first and second connectors 75a and 75b and the first and second inverters 74a and 74b may be arranged symmetrically along the vertical center line of the light emitting surface of the backlight unit. For example, the first connector 75a and the first inverter 74a may be provided at the left of the left-side divided regions, and the second connector 75b and the second inverter 74b may be provided at the right of the right-side divided regions.

A driving voltage may be applied from one of the first and second inverters 74a and 74b through one of the first and second connectors 75a and 75b to both ends of the respective fluorescent lamps 71. Accordingly, when the driving voltage is applied to the electrodes 72a and 72b of the fluorescent lamps 71 from the inverters 74a and 74b through the connectors 75a and 75b, the fluorescent lamps 71 emit light.

In addition, the backlight unit also includes a plurality of LED lamps 73. In particular, the LED lamps 73 are arranged along the vertical center line of the light emitting surface of the backlight unit to maintain the uniformity of luminance along the central line. In particular, the LED lamps 73 may have the same chromaticity coordinates as that of an adjacent one of the fluorescent lamps 71. As a result, the LED lamps 73 compensate for the luminance in the regions where the bent portions of the fluorescent lamps 71 meet. Moreover, the backlight unit includes an outer case 70 for fixing and supporting the fluorescent lamps 71 and the LED lamps 73.

Figure 8:
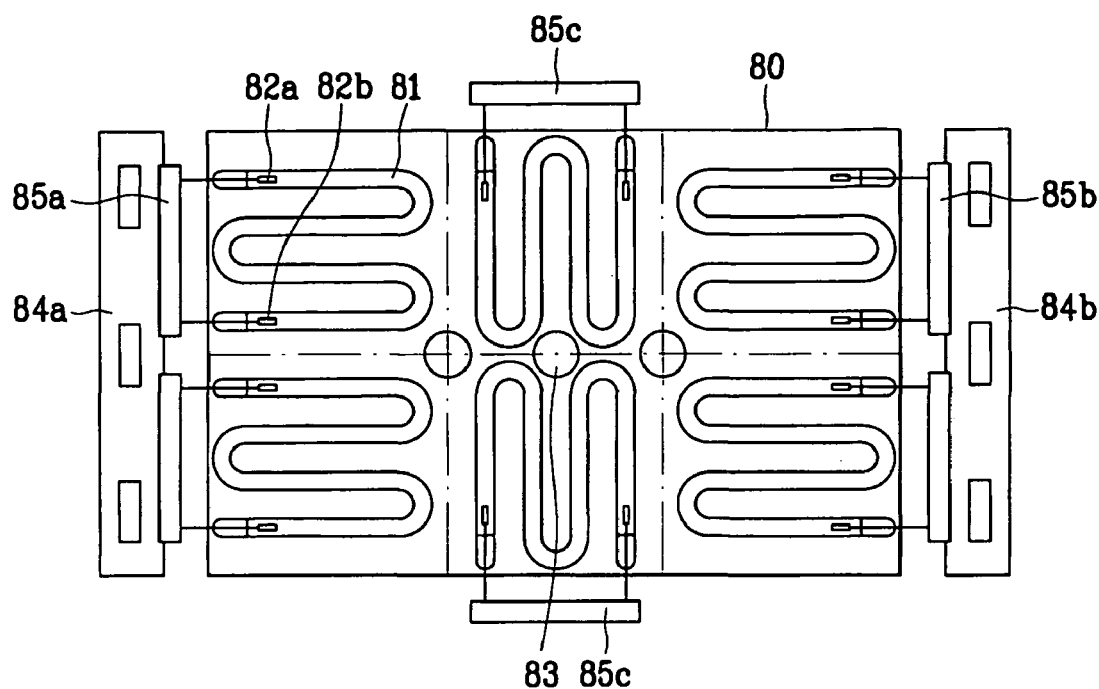
FIG. 8 is a plane view schematically illustrating a backlight unit of an LCD device according to yet another embodiment of the present invention.

FIG. 8 is a plane view schematically illustrating a backlight unit of an LCD device according to yet another embodiment of the present invention. In FIG. 8, a backlight unit has a light-emitting surface divided into six regions as illustrated by dashed lines, and the divided regions may have symmetric structures along a vertical center line and a horizontal center line of a light-emitting surface of the backlight unit. The vertical center line may be an imaginary vertical line drawn perpendicular from a mid-point along the width of the light-emitting surface, and the horizontal center line may be an imaginary horizontal drawn perpendicular from a mid-point along the length of the light-emitting surface.

Each of the divided regions includes a fluorescent lamp 81 having three bent portions. The fluorescent lamps 81 may be cold cathode fluorescent lamps (CCFLs). Further, in the left-side divided regions, the fluorescent lamps 81 may have an 'M'-like shape clockwise rotated by 90°, in the right-side divided regions, the fluorescent lamps 81 may have an 'M'-like shape counterclockwise rotated by 90°, in the upper central divided region, the fluorescent lamp 81 may have an "W"-like shape, and in the lower central divided region, the fluorescent lamp 81 may have an "M"-like shape.

Each of the fluorescent lamps 81 includes two lamp electrodes 82a and 82b respectively at two ends thereof. The lamp electrodes 82a and 82b are electrically connected to one of first, second and third connectors 85a, 85b, and 85c. The first connectors 85a may include a plurality of first connectors, such that one connector is connected to two ends of a respective one of the fluorescent lamps 71. Similarly, the second and third connectors 85b and 85c may respectively include a plurality of connectors, such that one connector is connected to two ends of a respective one of the fluorescent lamps 81.

In particular, the first and second connectors 85a and 85b and first and second inverters 84a and 84b may be arranged symmetrically along the vertical center line of the light emitting surface of the backlight unit. For example, the first connector 85a and the first inverter 84a may be provided at the left of the left-side divided regions, and the second connector 85b and the second inverter 84b may be provided at the right of the right-side divided regions.

In addition, the third connectors 85c may be arranged symmetrically along the horizontal center line of the light emitting surface of the backlight unit. For example, one of the third connectors 85c may be arranged at the top of the upper central divided region, and another one of the third connectors 85c may be arranged at the bottom of the lower central divided region. Although not shown, the backlight unit may include a third inverter coupled with the third connectors 85c. Alternatively, the third connectors 85c may be coupled to one of the first and second inverters 84a and 84b.

A driving voltage may be applied through one of the first, second and third connectors 85a, 85b, and 85c to both ends of the respective fluorescent lamps 81. Accordingly, when the driving voltage is applied to the electrodes 82a and 82b of the fluorescent lamps 81 through the connectors 85a, 85b and 85c, the fluorescent lamps 81 emit light.

In addition, the backlight unit also includes a plurality of LED lamps 83. In particular, the LED lamps 83 are arranged along the horizontal center line of the light emitting surface of the backlight unit to maintain the uniformity of luminance along the central line. In particular, the LED lamps 83 may have the same chromaticity coordinates as that of an adjacent one of the fluorescent lamps 81. As a result, the LED lamps 83 compensate the luminance in the regions where the bent portions of the fluorescent lamps 81 meet. Moreover, the backlight unit includes an outer case 80 for securing and supporting the fluorescent lamps 81 and the LED lamps 83.

Figure 9:
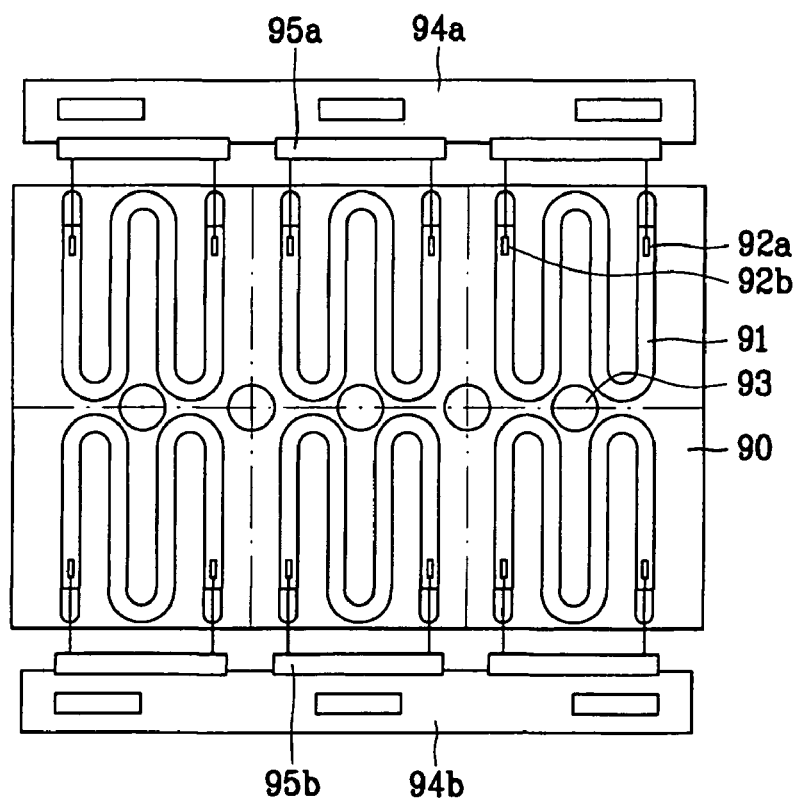
FIG. 9 is a plane view schematically illustrating a backlight unit of an LCD device according to another embodiment of the present invention.

FIG. 9 is a plane view schematically illustrating a backlight unit of an LCD device according to another embodiment of the present invention. In FIG. 9, a backlight unit has a light-emitting surface divided into six regions as illustrated by dashed lines, and the divided regions may have symmetric structures along a vertical center line and a horizontal center line of a light-emitting surface of the backlight unit. The vertical center line may be an imaginary vertical line drawn perpendicular from a mid-point along the width of the light-emitting surface, and the horizontal center line may be an imaginary horizontal drawn perpendicular from a mid-point along the length of the light-emitting surface.

Each of the divided regions includes a fluorescent lamp 91 having three bent portions. The fluorescent lamps 91 may be cold cathode fluorescent lamps (CCFLs). Further, in the upper divided regions, the fluorescent lamps 91 may have an "W"-like shape, and in the lower divided regions, the fluorescent lamp 91 may have an "M"-like shape.

Each of the fluorescent lamps 91 includes two lamp electrodes 92a and 92b respectively at two ends thereof. The lamp electrodes 92a and 92b are electrically connected to one of first and second connectors 95a and 95c. The first connectors 95a may include a plurality of first connectors, such that one connector is connected to two ends of a respective one of the fluorescent lamps 91. Similarly, the second connectors 95b may respectively include a plurality of second connectors, such that one connector is connected to two ends of a respective one of the fluorescent lamps 91.

In particular, the first and second connectors 95a and 95b and first and second inverters 94a and 94b may be arranged symmetrically along the horizontal center line of the light emitting surface of the backlight unit. For example, the first connector 95a and the first inverter 94a may be provided at the top of the upper divided regions, and the second connector 95b and the second inverter 94b may be provided at the bottom of the lower divided regions.

A driving voltage may be applied from one of the first and second inverters 94a and 94b through one of the first and second connectors 95a and 95b to both ends of the respective fluorescent lamps 91. Accordingly, when the driving voltage is applied to the electrodes 92a and 92b of the fluorescent lamps 91 from the inverters 94a and 94b through the connectors 95a and 95b, the fluorescent lamps 91 emit light.

In addition, the backlight unit also includes a plurality of LED lamps 83. In particular, the LED lamps 93 are arranged along the horizontal center line of the light emitting surface of the backlight unit to maintain the uniformity of luminance along the central line. In particular, the LED lamps 93 may have the same chromaticity coordinates as that of an adjacent one of the fluorescent lamps 91. As a result, the LED lamps 93 compensate the luminance in the regions where the bent portions of the fluorescent lamps 91 meet. Moreover, the backlight unit includes an outer case 90 for securing and supporting the fluorescent lamps 91 and the LED lamps 93.

Moreover, although not shown, in the backlight units shown in FIG. 7 to FIG. 9, instead of having an "M"-like shape or an "W"-like shape, the fluorescent lamps may be formed in various shapes. For example, some of the fluorescent lamps may have an '⊂'-like or '⊃'-like shape, and some of the fluorescent lamps may have an "M"-like shape or an "W"-like shape. In addition, the fluorescent lamps may have more than three bent portions, for example, a combination of an "W"-like shape and an "U"-like shape resulting five bent portions.

Figure 10:
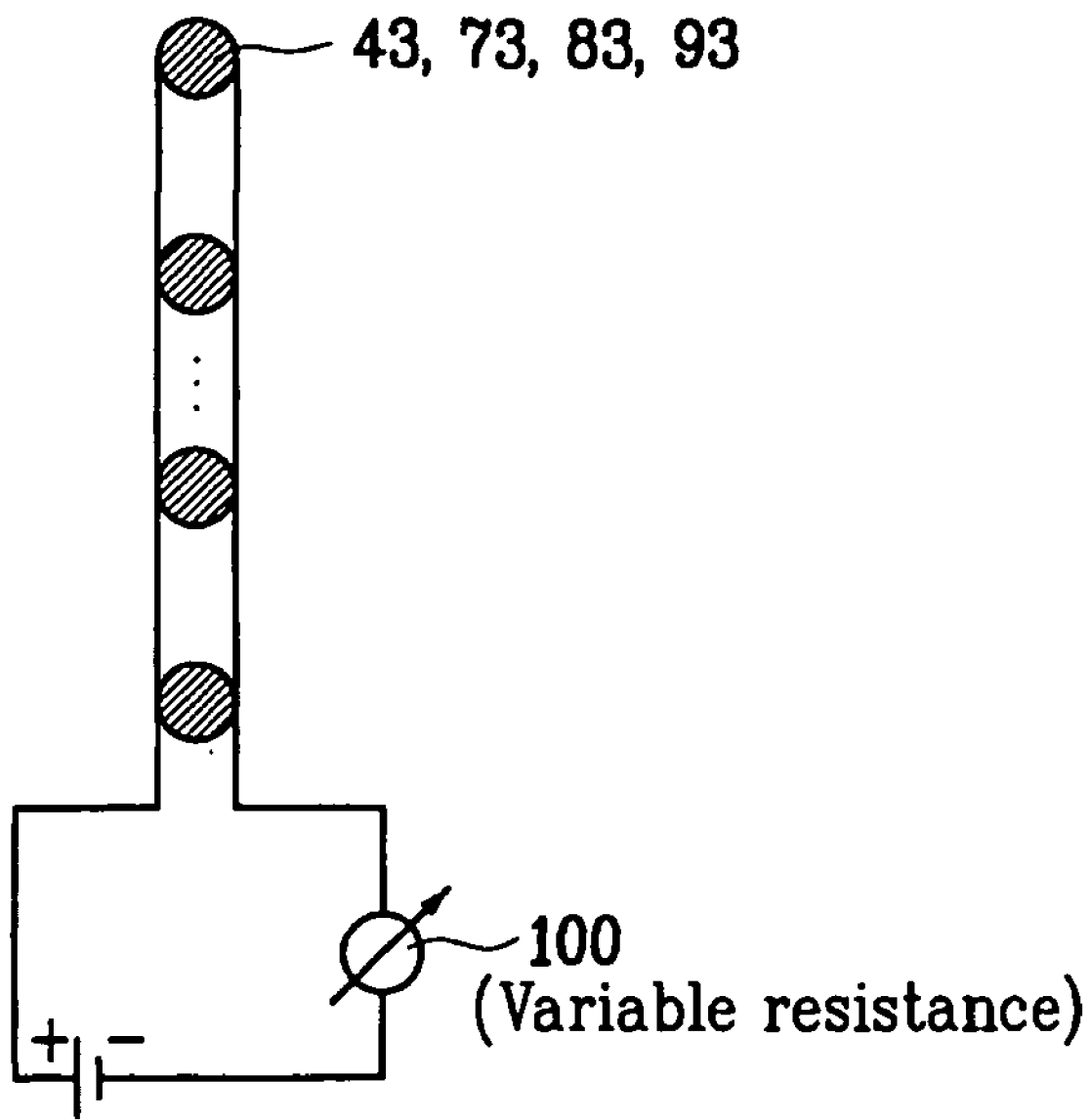
FIG. 10 is a circuit diagram schematically illustrating luminance control of an LED lamp according to an embodiment of the present invention.

FIG. 10 is a circuit diagram schematically illustrating luminance control of an LED lamp according to an embodiment of the present invention. In FIG. 10, the plurality of LED lamps 43, 73, 83 or 93 may be connected in series by, for example, connecting anode and cathode electrodes in common. Then, a variable resistance 100 is connected to one of the cathode and anode electrodes, and a voltage is connected to another one of the cathode and anode electrodes. As a result, the luminance of the LED lamps 43, 73, 83 or 93 may be controlled by varying a resistance value of the variable resistance 100. Accordingly, the LED lamps are dynamically controlled to maintain the uniformity of luminance in the regions where the bent portions of the fluorescent lamps 41, 71, 81 or 91 (shown in FIGS. 4, 7, 8 or 9) meet.

Hence, the backlight unit and the liquid crystal display device having the same according to an embodiment of the present invention includes a plurality of divided regions and a plurality of LED lamps in the regions where bent portions of fluorescent lamps meet, to thereby maintain the uniformity of luminance of the backlight unit. Accordingly, the luminance on the entire screen is uniformly maintained.

It will be apparent to those skilled in the art that various modifications and variations can be made in the backlight unit and the liquid crystal display device having the same of the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
    a light-emitting surface having N divided regions, N being a positive integer and the divided regions being symmetrically arranged along a vertical center line and a horizontal center line of the light-emitting surface;
    one of a plurality of fluorescent lamps in each of the divided regions, each of the fluorescent lamps having at least one bent portion and two electrodes respectively at two ends thereof; and
    an LED lamp arranged along one of the vertical center line and the horizontal center line and at a region where bent portions of the fluorescent lamps meet.

2. The backlight unit of claim 1, wherein the fluorescent lamps have an '⊂'-like or '⊃'-like shape.

3. The backlight unit of claim 1, wherein the fluorescent lamps have an "W"-like shape or "M"-like shape.

4. The backlight unit of claim 1, wherein the LED lamp has the same chromaticity coordinates as that of an adjacent one of the fluorescent lamps.

5. The backlight unit of claim 1, further comprising:
    first and second inverters respectively arranged at opposing sides of the light-emitting surface; and
    first and second connectors respectively connecting one of the first and second inverters with one of the fluorescent lamps.

6. The backlight unit of claim 5, wherein the first and second inverters are symmetrically arranged along the vertical center line of the light-emitting surface.

7. The backlight unit of claim 5, wherein the first and second inverters are symmetrically arranged along the horizontal center line of the light-emitting surface.

8. The backlight unit of claim 1, further comprising:
    an outer case for securing the fluorescent lamps and the LED lamp;
    a reflective sheet below the fluorescent lamps; and
    an optical sheet above the fluorescent lamps.

9. The backlight unit of claim 1, wherein the LED lamp includes:
    an LED chip of emitting light;
    a reflective curve of surrounding a side of the LED chip;
    an optical lens covering the LED chip;
    a cathode lead wire connected with one end of the LED chip; and
    an anode lead wire connected with the other end of the LED chip by a wire.

10. The backlight unit of claim 9, further comprising:
    an outer case for securing the fluorescent lamps and the LED lamp;
    a voltage source; and
    a variable resistance,
    wherein the cathode and anode lead wires of the LED lamp protrude through a rear surface of the outer case and connect in common, the variable resistance is connected with one of cathode and anode electrodes, and the voltage source is connected with another one of cathode and anode electrodes.

11. A liquid crystal display device, comprising:

a liquid crystal display panel including an upper substrate, a lower substrate attached to the upper substrate, and a liquid crystal layer between the upper and lower substrates; and a backlight unit disposed at a back side of the liquid crystal display panel, the backlight unit including a light-emitting surface having N divided regions, N being a positive integer and the divided regions being symmetrically arranged along a vertical center line and a horizontal center line of the light-emitting surface, one of a plurality of fluorescent lamps in each of the divided regions, each of the fluorescent lamps having at least one bent portion and two electrodes respectively at two ends thereof, an LED lamp arranged along one of the vertical center line and the horizontal center line and at a region where bent portions of the fluorescent lamps meet, and a bottom cover securing the fluorescent lamps and the LED lamp.

12. The liquid crystal display device of claim 11, wherein the fluorescent lamps have an '⊂'-like or '⊃'-like shape.

13. The liquid crystal display device of claim 11, wherein the fluorescent lamps have an "W"-like or "M"-like shape.

14. The liquid crystal display device of claim 11, wherein the LED lamp has the same chromaticity coordinates as that of an adjacent one of the fluorescent lamps.

15. The liquid crystal display device of claim 11, further comprising:

first and second inverters respectively arranged at opposing sides of the light-emitting surface; and first and second connectors respectively connecting one of the first and second inverters with one of the fluorescent lamps.

16. The liquid crystal display device of claim 15, wherein the first and second inverters are symmetrically arranged along the vertical center line of the light-emitting surface.

17. The liquid crystal display device of claim 15, wherein the first and second inverters are symmetrically arranged along the horizontal center line of the light-emitting surface.

18. The liquid crystal display device of claim 11, further comprising:

a reflective sheet below the fluorescent lamps; and an optical sheet above the fluorescent lamps.

19. The liquid crystal display device of claim 11, wherein the LED lamp includes:

an LED chip of emitting light;

a reflective curve of surrounding a side of the LED chip;

an optical lens covering the LED chip;

a cathode lead wire connected with one end of the LED chip; and an anode lead wire connected with the other end of the LED chip by a wire.

20. The liquid crystal display device of claim 19, further comprising:

a voltage source; and a variable resistance, wherein the cathode and anode lead wires of the LED lamp protrude through a rear surface of the outer case and connect in common, the variable resistance is connected with one of cathode and anode electrodes, and the voltage source is connected with another one of cathode and anode electrodes.

* * * * *